(12) United States Patent
Nwankpa et al.

(10) Patent No.: US 9,857,808 B2
(45) Date of Patent: Jan. 2, 2018

(54) DYNAMIC LOAD MODELING OF A BUILDING'S ENERGY CONSUMPTION FOR DEMAND RESPONSE APPLICATIONS

(75) Inventors: Chikaodinaka Nwankpa, Philadelphia, PA (US); Karen Miu Miller, Philadelphia, PA (US); Jonathan Berardino, Philadelphia, PA (US); Alain Steven, Lansdale, PA (US)

(73) Assignees: Drexel University, Philadelphia, PA (US); Viridity Energy, Inc., Philadelphia, PA (US)

( * ) Notice: Subject to any disclaimer, the term of this patent is extended or adjusted under 35 U.S.C. 154(b) by 434 days.

(21) Appl. No.: 13/825,068

(22) PCT Filed: Sep. 30, 2011

(86) PCT No.: PCT/US2011/054250
§ 371 (c)(1),
(2), (4) Date: Aug. 12, 2013

(87) PCT Pub. No.: WO2012/044946
PCT Pub. Date: Apr. 5, 2012

(65) Prior Publication Data
US 2014/0148953 A1      May 29, 2014

Related U.S. Application Data (60) Provisional application No. 61/389,079, filed on Oct. 1, 2010.

(51) Int. Cl.
*G05D 23/19* (2006.01)
*G06Q 10/06* (2012.01)
*G06Q 50/06* (2012.01)

(52) U.S. Cl.
CPC ......... *G05D 23/19* (2013.01); *G06Q 10/0631* (2013.01); *G06Q 50/06* (2013.01)

(58) Field of Classification Search
CPC .. F24F 11/0086; F24F 11/006; F24F 11/0067; F24F 11/0012; G05B 15/02; G05D 23/19; G06Q 10/0631; G06Q 50/06
USPC ....................................................... 700/276
See application file for complete search history.

(56) References Cited

U.S. PATENT DOCUMENTS

| | | |
|---|---|---|
| 5,924,486 A | 7/1999 | Ehlers et al. |
| 5,963,458 A | 10/1999 | Cascia |
| 6,134,511 A | 10/2000 | Subbarao |
| 6,785,592 B1 | 8/2004 | Smith et al. |
| 6,968,295 B1 | 11/2005 | Carr |
| 7,392,115 B2 | 6/2008 | Schindler |
| 7,552,033 B1 | 6/2009 | Culp et al. |

(Continued)

OTHER PUBLICATIONS

Hill, D. J., "Nonlinear Dynamic Load Models with Recovery for Voltage Stability Studies," IEEE Transactions on Power Systems, Feb. 1993, 8(1), 166-176.

(Continued)

*Primary Examiner* — Robert Fennema
*Assistant Examiner* — Jigneshkumar Patel
(74) *Attorney, Agent, or Firm* — Baker & Hostetler LLP (57) ABSTRACT

A dynamic electrical load model for an HVAC chiller for use in demand response applications is described herein. A dynamic model for coupling a building's electrical and thermal characteristics is described. This allows for more accurate planning of the dispatching of load for demand side response.

20 Claims, 8 Drawing Sheets

(56) References Cited

U.S. PATENT DOCUMENTS

| | | | |
|---|---|---|---|
| 8,959,006 B2* | 2/2015 | Nasle | G06F 17/5009 700/11 |
| 2005/0107892 A1 | 5/2005 | Matsui et al. | |
| 2005/0192680 A1 | 9/2005 | Cascia et al. | |
| 2005/0194455 A1 | 9/2005 | Alles | |
| 2006/0065750 A1* | 3/2006 | Fairless | 236/46 R |
| 2007/0005191 A1 | 1/2007 | Sloup et al. | |
| 2008/0277486 A1* | 11/2008 | Seem et al. | 236/49.3 |
| 2009/0216382 A1 | 8/2009 | Ng | |
| 2010/0010678 A1 | 1/2010 | Dawson et al. | |
| 2010/0063644 A1 | 3/2010 | Kansal et al. | |
| 2010/0082309 A1 | 4/2010 | Dawson et al. | |
| 2010/0088261 A1 | 4/2010 | Montalvo | |
| 2010/0114385 A1 | 5/2010 | Dempster et al. | |
| 2010/0131109 A1 | 5/2010 | Rasmussen et al. | |
| 2010/0235011 A1 | 9/2010 | Tolia et al. | |
| 2010/0324962 A1* | 12/2010 | Nesler | G01R 21/133 705/7.36 |

OTHER PUBLICATIONS

IEEE Task Force on Load Model Representation for Dynamic Performance, "Bibliography on Load Models for Power Flow and Dynamic Performance Simulation," IEEE Transactions on Power Systems, Feb. 1995, 10(1), 523-538.

International Patent Application No. PCT/US2011/054250: International Search Report and Written Opinion dated Feb. 27, 2012, 16 pages.

Kiliccote et al., "Dynamic Controls for Energy Efficiency and Demand Response: Framework Concepts and a New Construction Study Case in New York," Proceedings of the 2006 ACEEE Summer Study on Energy Efficiency in Buildings, Pacific Grove, CA, Aug. 13-18, 2006, 13 pages.

Lam et al., "An analysis of electricity end-use in air-conditioned office buildings in Hong Kong," Building and Environment, Mar. 2003, 38(3), 493-498.

Liang et al., "Dynamic Reactive Load Model," IEEE Transactions on Power Systems, Nov. 1998, 13(4), 1365-1372.

One hundred tenth Congress of the United States of America, "Energy Independence and Security Act of 2007," H. R. Res. 6, Jan. 4, 2007, available at http://www.govtrack.us/congress/bill.xpd?bill=h110-6, 310 pages.

U.S. Department of Energy, "Benefits of Demand Response in Electricity Markets and Recommendations for Achieving Them," A Report to the United States Congress Pursuant to the Section 1252 of the Energy Policy Act of 2005, Feb. 2006, available at http://eetd.lbl.gov/ea/EMP/reports/congress-1252d.pdf, 122 pages.

Xu et al., "Peak Demand reduction from Pre-Cooling with a Zone Temperature reset in an Office Building," 2004 ACEEE Summer Study on Energy Efficiency in Buildings, Pacific Grove, CA, Aug. 23-27, 2004, 3-376-3-386.

* cited by examiner

DYNAMIC LOAD MODELING OF A BUILDING'S ENERGY CONSUMPTION FOR DEMAND RESPONSE APPLICATIONS

CROSS-REFERENCE TO RELATED APPLICATIONS

This application is the National Stage of International Application No. PCT/US2011/054250, filed Sep. 30, 2011, which claims the benefit of U.S. Provisional Application No. 61/389,079, filed Oct. 1, 2010, the disclosures of which are incorporated herein by reference in their entireties.

BACKGROUND

The recent push for the development of a "Smart Grid" will result in significant changes to the existing transmission and distribution networks, both in terms of the technology employed, as well as the manner in which the grid is operated. See, e.g., *Energy Independence and Security Act of 2007*, H.R. Res. 6, 110th Congress (2007) (enacted) (hereinafter "Energy Independence and Security Act of 2007"), the contents of which are hereby incorporated by reference in its entirety. These changes will result in new methods and opportunities for utilities and customers to control demand levels on the power grid. From the utility's perspective, advances in demand response capabilities through communication and automation improvements will lead to improved grid reliability through reduction in peak load and reduced congestion on the power lines. For the end-user, electricity costs will be reduced through better methods of planning and controlling their facility's electricity usage. To achieve this end, particularly with respect to this new level of customer involvement in the electricity market, better models and tools are needed to optimize the shifting, shedding, and overall control of a customer's electrical load.

For most commercial facilities, such as large office buildings, hotels, etc. the biggest percentage of electrical load is comprised of the lighting and HVAC systems. See, e.g., J. C. Lam, et al., *An analysis of electricity end-use in air-conditioned office buildings in Hong Kong*, Building and Environment, vol. 38, No. 3, pp. 493-498, March 2003, the contents of which are hereby incorporated by reference in its entirety. Appropriately controlling the HVAC systems can lead to significant savings. However, there are several challenges associated with HVAC controls, and therefore an accurate model is needed to realize the potential gains while minimizing any undesirable impacts, particularly the building comfort level. This comfort level is mainly directly related to temperature, among other ambient parameters (e.g. humidity, CO2 levels, etc.). To adequately dispatch a building's HVAC load, what is needed is a characterization of the relationship between the building thermal response and electrical demand. Static load models cannot capture the coupling that exists between building temperature and electric power sufficiently when it comes to demand response because of the long system time delays that come about due to this coupling. What is needed is an understanding of the load behavior during these response times.

Various methods of demand response have been in practice for many years. Existing demand response options can be grouped in 2 basic types: Price-Based options, such as Critical Peak Pricing (CPP), and Incentive-Based Programs, such as direct load control and load curtailment programs. See, e.g., US Department of Energy, *Benefits of Demand Response in Electricity Markets and Recommendations for Achieving Them*, Report to the United States Congress, February 2006 (hereinafter "Benefits of Demand Response"), the contents of which are hereby incorporated by reference in its entirety. It is desirable to advance these markets as part of the future "Smart Grid." In order to accomplish this, it is also desirable to advance the tools being used to evaluate and control the demand side.

Traditionally in power systems, loads are represented in aggregate. Loads are grouped by bus, or substation, and modeled as one complex power injection of the form shown in (1).

$$S_i^{inj} = P_i^{inj} + jQ_i^{inj} \tag{1}$$

where $S_i^{inj}$ represents complex power, $P_i^{inj}$ represents real power, and $jQ_i^{inj}$ represents reactive power.

While this structure is convenient in that it reduces model complexity when performing power system analysis, it is not appropriate for utilization in demand response. What is needed is an alternative approach that is better suited for demand response applications.

SUMMARY

According to one embodiment, a method is disclosed for using a dynamic electrical load model to model a building's energy consumption (electrical) characteristics with respect to changes in temperature for use in demand response applications. In electricity grids, demand response (DR) may refer to mechanisms used to manage customer consumption of electricity in response to supply conditions. Electricity customers may reduce their consumption at critical times and/or in response to market prices. With an accurate model of a building's electrical energy consumption, better decisions concerning demand response may be made. The coupling of a building's electrical and thermal characteristics is not adequately captured using current static models. Instead, a dynamic model is used. This may allow for more accurate planning of the dispatching of load by a utility for demand side response.

According to one embodiment, an HVAC chiller dynamic load model may be used as a tool for developing and/or implementing improved demand response plans for any customer where their HVAC load is a significant portion of their total electric load. The dynamic model may accurately model the electrical energy consumption of an HVAC chiller in response to changes in building temperature control (thermostat). In the case of an HVAC chiller, raising or lowering the outlet chilled water temperature is a straightforward action a facilities manager can take to increase or decrease the electric power drawn by the machine.

According to an exemplary embodiment, the present invention sets forth a method for using a dynamic electrical load model to model an energy consumption characteristic in a building with respect to changes in temperature for use in demand response applications. The method includes determining changes in a building temperature control; using a dynamic electrical load model to accurately model electrical energy consumption of an HVAC chiller in response to the changes in the building temperature control; and planning a dispatching of energy for demand side response based on said use of said dynamic electrical load model.

According to another exemplary embodiment, the present invention sets forth a computer-implemented method for using a dynamic electrical load model to model an energy consumption characteristic in a building with respect to changes in temperature for use in demand response applications. The method includes using a dynamic electrical load model to accurately model electrical energy consumption of an HVAC chiller; and planning a dispatching of energy load for demand side response based on said use of said dynamic electrical load model.

According to yet another exemplary embodiment, the present invention sets forth a computer-readable storage medium. The computer-readable medium contains computer executable instructions thereon that are configured to cause a computer system to perform a several steps when executed. Those steps include using a dynamic electrical load model to accurately model electrical energy consumption of an HVAC chiller; and planning a dispatching of energy load for demand side response based on said use of said dynamic electrical load model.

DETAILED DESCRIPTION OF ILLUSTRATIVE EMBODIMENTS

The disclosed embodiments are directed to methods of using a dynamic electrical load model to model a building's energy consumption (electrical) characteristics with respect to changes in temperature for use in demand response applications. In electricity grids, demand response may refer to mechanisms used to manage customer consumption of electricity in response to supply conditions. Electricity customers may reduce their consumption at critical times and/or in response to market prices. With an accurate model of a building's electrical energy consumption, better decisions concerning demand response may be made. The coupling of a building's electrical and thermal characteristics is not adequately captured using current static models. Instead, a dynamic model is used. This may allow for more accurate planning of the dispatching of load by a utility for demand side response.

In one particular embodiment, an HVAC chiller dynamic load model may be used as a tool for developing and/or implementing improved demand response plans for any customer where their HVAC load is a significant portion of their total electric load. The dynamic model may accurately model the electrical energy consumption of an HVAC chiller in response to changes in building temperature control (thermostat). In the case of an HVAC chiller, raising or lowering the outlet chilled water temperature is a straightforward action a facilities manager can take to increase or decrease the electric power drawn by the machine.

An approach that is well suited for demand response application is a component-based model, where the structure of the model mimics that which is observed physically. The advantages of this model may include: (1) increased granularity that may provide more opportunities for customers to control and dispatch loads in demand response programs; and/or (2) a clear understanding of the dynamic response of HVAC loads due to the natural coupling of the electric demand and the thermal response of the building.

If the end purpose is to use this model for demand response, characterizing the electrical load response to a control action may be appropriate. In the case of an HVAC chiller, raising or lowering the outlet chilled water temperature may be a straightforward action that a facilities manager can take to increase and/or decrease the electric power drawn by the machine. Thus, a mathematical model for the HVAC chiller electrical load response to a change in outlet temperature setpoint is described herein.

A. TEST DESCRIPTION

Figure 1A:
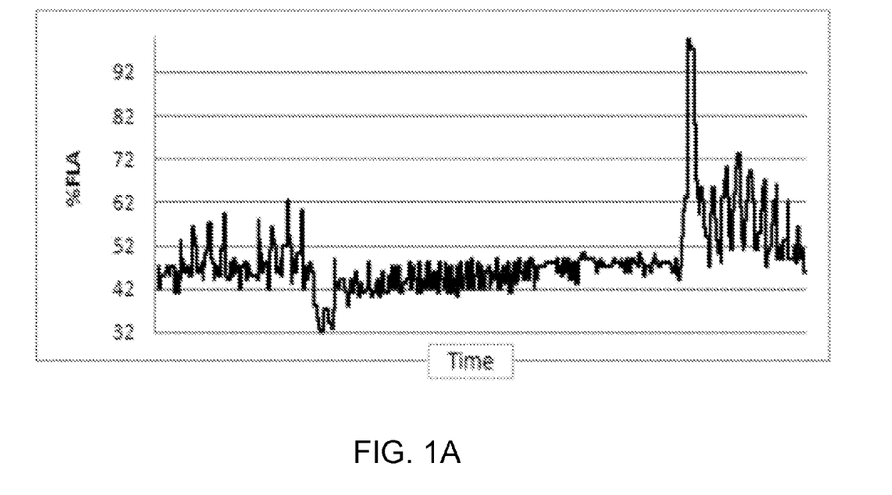
FIG. 1A is a graphical illustration of electrical load data collected over a period of time.
Figure 1B:
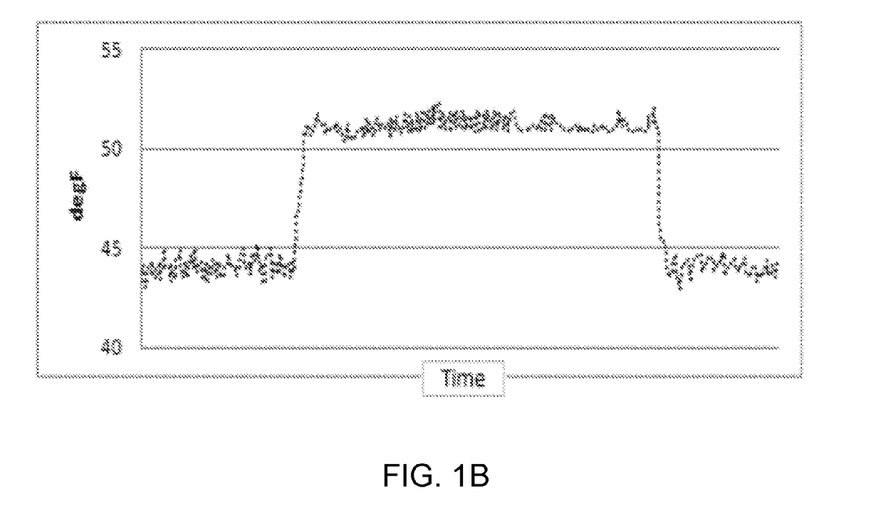
FIG. 1B is a graphical illustration of a chilled water outlet temperature collected over a period of time.
Figure 2:
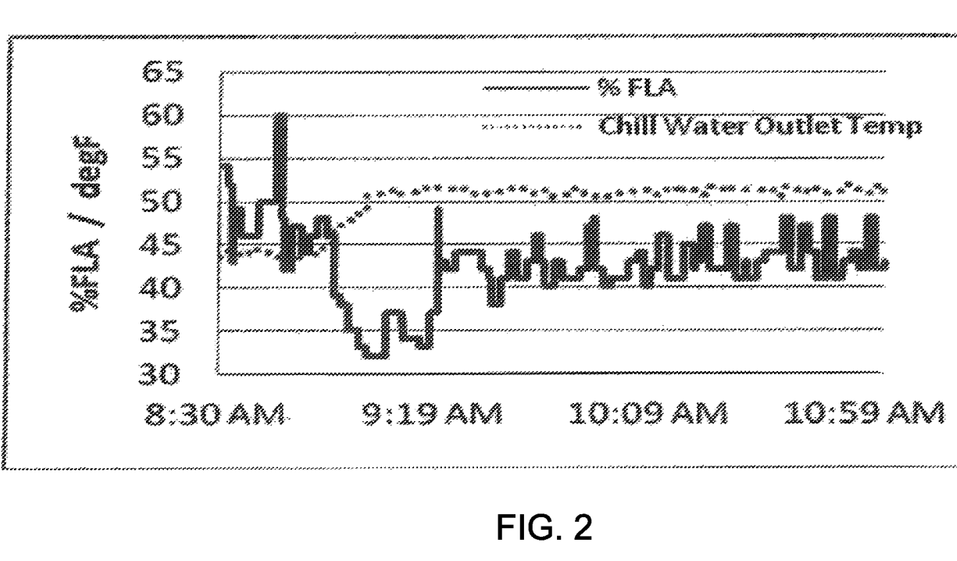
FIG. 2 is a graphical illustration of an electric load versus a chilled water outlet temperature collected over a period of time.

For the reasons indicated above, a mathematical model that characterizes the electrical response of an HVAC chiller's electrical load response to a change in outlet temperature setpoint has been developed. This model is derived from data collected from tests performed on Drexel University's chilled water system at one of its buildings. More specifically, data was collected during tests performed for several buildings on Drexel University's campus whose cooling load was carried on a single chiller. For this particular chiller, as illustrated in FIGS. 1A, 1B, and 2, the outlet water temperature for the chiller began at forty-four degrees Fahrenheit. At approximately nine o'clock a.m., the temperature setpoint was raised to fifty-one degrees Fahrenheit. This was the only change made to the HVAC system. All other system operations may be allowed to operate as normal (i.e. fan speeds, damper positions, etc.). While this may not be the most effective in terms of a demand response activity since the overall power draw of the system might not decrease as much as desired, this may allow the chiller electrical response to the setpoint to change independent of any other HVAC control actions.

FIGS. 1A, 1B, and 2 illustrate chiller load data and outlet water temperature values. The chiller electrical load data illustrated in FIGS. 1A and 2 is in terms of percentage of full load amps ("FLA"). This data was recorded by the Drexel building management system ("BMS"), which measures the chiller electrical load in terms of percentage FLA. Because at the present time there are no local voltage measurements available, it is assumed that there is a constant voltage profile and the % FLA reading is a direct reflection of the real power drawn by the chiller motor. This may be a reasonable assumption for loads at the distribution level. Another advantage of plotting the electrical power is to view the electrical response and outlet temperature response on the same graph. This is demonstrated more clearly in FIG. 2. FIG. 2 more clearly shows the electrical response versus the temperature response, and in looking to develop a mathematical model for this component it may be more telling to examine this time period.

B. MATHEMATICAL MODEL DERIVATION

Several important points may be drawn from observing the response in FIG. 2. The recovery of the electrical load does not exhibit the "fast" response normally associated with electrical systems. Due to the dependence of the electrical load on the temperature of the system, there are long time delays involved in the load recovery. While the speed of the response may be unique to this type of system, the general electrical power response has been exhibited before in dynamic load studies of transmission systems. Exemplary references which discuss dynamic load studies of transmission systems include the following: [1] Y. Liang, et al., *Dynamic Reactive Load Model*, IEEE Transactions on Power Systems, vol. 13, No. 4, pp. 1365-1372, November 1998; [2] D. Hill, *Nonlinear Dynamic Load Models with Recovery for Voltage Stability Studies*, IEEE Transactions on Power Systems, vol. 8, No. 1, pp 166-176, February 1993; and [3] IEEE Task Force on Load Model Representation for Dynamic Performance, *Bibliography on Load Models for Power Flow and Dynamic Performance Simulation*, IEEE Trans. PWRS-10, No. 1, pp. 523-538, February 1995, the contents of which are hereby incorporated by reference in their entirety.

As illustrated in references [1]-[3] an exponential recovery may be used to characterize the real and reactive power responses to a step change in voltage. This general approach can be used for the HVAC chiller model as well.

To express the electric power response of the chiller, a similar equation as those illustrated in references [1]-[3] may be applied. The chiller is a function of time and outlet water temperature change in lieu of time and voltage. A general set of equations describing this model is presented in equations (2)-(4) below.

$$T\frac{dP_d(t)}{dt} + P_d(t) = P_s(\Theta) + T\frac{dP_t(\Theta)}{dt} \tag{2}$$

$$P_s(\Theta) = P_o\left(\frac{\Theta(t-t_c)}{\Theta_o}\right)^{\beta_s} \tag{3}$$

$$P_t(\Theta) = P_o\left(\frac{\Theta(t-t_c)}{\Theta_o}\right)^{\beta_t} \tag{4}$$

where tc is time delay between temperature change and response; T is dynamic load time constant; Po is initial real power value; Ps is static load model; Pt is transient load model; Pd is dynamic load function; Θ is chilled water outlet temperature; Θo is initial chilled water temperature value; βs is static load model exponential index; βt is transient load model exponential index.

As discussed in Benefits of Demand Response, referenced above, a closed form solution may be derived to Equation (2) in the event of a step change in temperature (change in setpoint level):

$$P_d(t) = P_s(\Theta) + (P_t(\Theta) - P_s(\Theta))e^{-(t-tc)/T_r} \tag{5}$$

Figure 3A:
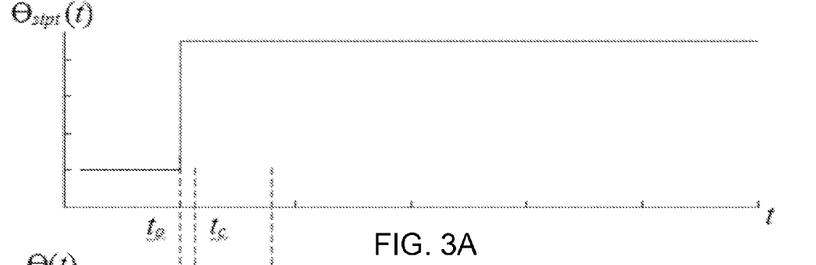
FIGS. 3A-3E are graphical illustrations of a response to a step change in the chilled water temperature setpoint value.
Figure 3B:
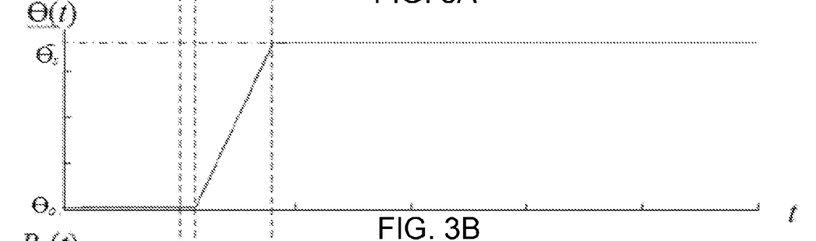
Figure 3C:
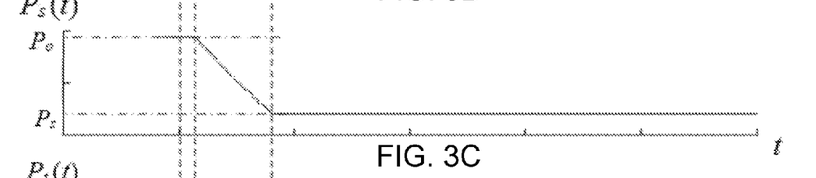
Figure 3D:
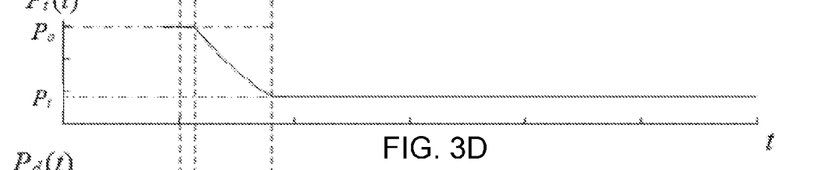
Figure 3E:
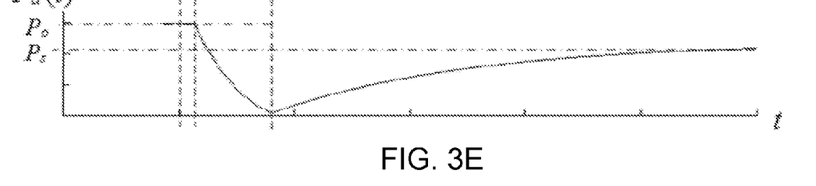

Graphically, the equations describing this response in (2)-(5) are shown in FIGS. 3A-3E for an arbitrary increase in the outlet water temperature setpoint. FIG. 3A shows the outlet water temperature setpoint Θstpt as a function of time t. FIG. 3B shows the chilled water outlet temperature Θ as a function of time t, where Θo is the initial chilled water temperature value and Θs is the new steady state chilled water temperature value. FIG. 3C shows the steady state electric power level Ps as a function of time t, where Po is the initial electric power level and Ps is the new steady state electric power level. FIG. 3D shows the transient power level Pt as a function of time t, where Pt is the transient power level. FIG. 3E shows the Pd is dynamic load as a function of time t.

With respect to FIGS. 3A-3E, phenomena of note include the time delay between when the temperature setpoint is raised and when the actual chilled water temperature begins to increase, as well as how the dynamic load function Pd recovers to a new steady state power value that is slightly less than the initial power value Po. As we will see, these phenomena, as well as the extended time it takes for the HVAC load power to recover, may be important in applying this model to demand response programs.

C. CURVE FITTING AND PARAMETER ESTIMATION

Given the mathematical model presented above, the next step is to estimate the model parameters based on the observed test data. The general approach to parameter estimation used is the method of least squares, as shown in equation (6):

$$\min \sum_{i=1}^{N} (P_d(i) - P_m(i)) \tag{6}$$

Figure 4:
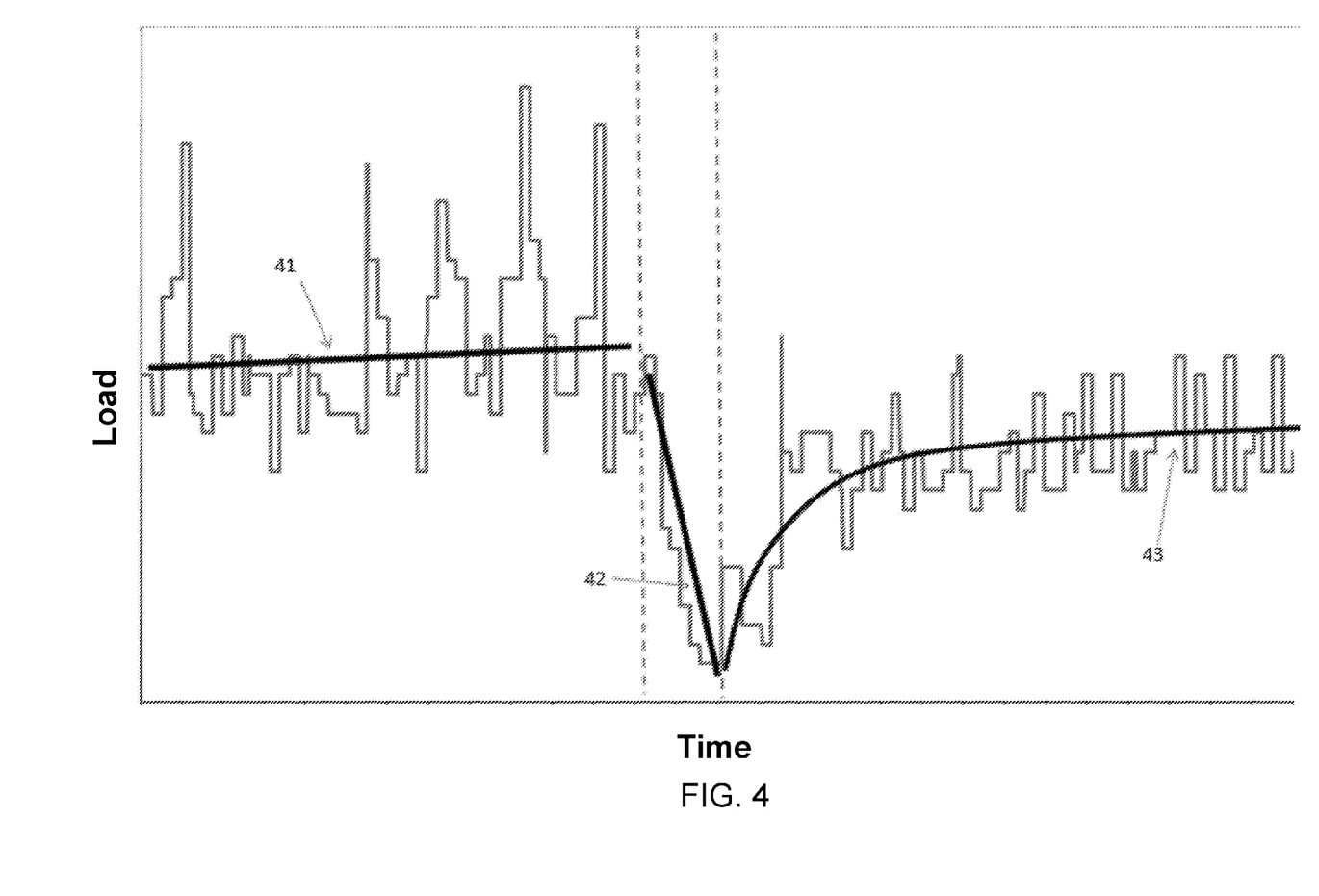
FIG. 4 is a graphical illustration of a curve fit approach on data collected for parameter estimation.

There are several parameters from equations (2)-(5) that need to be estimated, including Θo, Θs, Po, tc, $T_R$, βs, and βt. These parameters may be solved for by directly observing the data to measure the values, as well as applying appropriate curve fits. The parameters may be solved for below in the following order: i) tc ii) Θo, Θs, Po, $T_R$ iii) βs and βt.

i) The time delay tc is measured as the time delay between raising the chilled water temperature setpoint and when the actual temperature begins to respond. This delay is measured directly from the data. Through several tests performed at Drexel, this time delay was observed to be on the order of 100-1000 seconds. These numbers seem reasonable but more testing or research into the chiller control system may be warranted to better understand the source(s) and characteristics driving this delay.

ii) Each of parameters Θo, Θs, Po, $T_R$ were estimated by curve fitting the collected data. FIG. 4 shows the curve fit approach to the collected data. As shown in FIG. 4, the fit can easily be broken into three sections. Line segment 41 is applied to the initial load behavior prior to raising the temperature setpoint. Line segment 42 is applied to the drop in load following the setpoint change. Line segment 43, representing the load recovery response, is fit using an exponential regression of the general form shown in (7):

$$Y = A(1 - e^{\beta t}) \tag{7}$$

iii) The static load model exponential index parameter βs can be estimated directly using equation (8):

$$\beta_s = \ln\left(\frac{P_s}{P_o}\right) / \ln\left(\frac{\Theta_s}{\Theta_o}\right) \tag{8}$$

where Ps and Θs are the new steady state values for electric power and chilled water temperature respectively. This exponential index βs is for the static load power model of equation (3) and excludes the transient part of the collected data in its estimation.

The transient load model exponential index parameter βt can be estimated directly using equation (9):

$$\beta_t = \ln\left(\frac{P_s}{P_o}\right) / \ln\left(\frac{\Theta_s}{\Theta_o}\right) \quad (9)$$

where Pt is the transient power level, characterizing the initial drop in load power (maximum drop). This exponential index is used in equation (4), the transient load power model.

The parameter estimation method outlined in this section was applied to the test data shown in FIG. 2. Table I shows the resulting parameter estimates.

TABLE I

| Parameter Estimation Results | |
|---|---|
| $P_o$ | 49.75% |
| $P_s$ | 46.81% |
| $P_t$ | 28.25% |
| $\Theta_o$ | 44.11° F. |
| $\Theta_s$ | 51.27° F. |
| $\beta_s$ | −0.4 |
| $\beta_t$ | −3.76 |
| $t_c$ | 143 sec. |
| $T_R$ | 1689.47 sec. |

One important item of note from Table I is the load power recovery time $T_R$ is approximately 28 minutes. This demonstrates the extended response times due to the temperature and electrical load coupling. This far exceeds the expected "fast" response normally seen in electrical systems.

Given that the parameter estimation approach relied on curve fitting, how good the regression analysis is makes for a good indication of how appropriate the model described herein is. Table II shows the R-Squared values computed for line segments 41, 42, and 43 during the regression analysis.

TABLE II

| REGRESSION ANALYSIS RESULTS | | |
|---|---|---|
| | Line Segment | $R^2$ |
| Temp. Increase | 41 | 0.18 |
| | 42 | 0.88 |
| | 43 | 0.78 |

It is evident from Table II that the curve fit approach yielded better results for some line segments than others. This is most obvious in the linear fit for line segment 41. The R2 value indicates the linear regression is not a good fit for the data, however by close inspection of the data and application of a data smoothing technique such as a moving average, one can see the linear fit is appropriate. The data collected contained significant noise, leading to seemingly incorrect fits. This is observed line segments 42 and 43 as well but not to the same degree. In addition to the noise, there is a hunting issue with some chillers. This issue may be a considerable source of noise in the data. Correcting this problem prior to future testing may help achieve test data reflecting more regular behavior.

D. DEMAND RESPONSE APPLICATIONS

The HVAC chiller dynamic load model presented above may be used as a tool for developing and implementing improved demand response plans for any customer where their HVAC load is a significant portion of their total electric load. Currently many large facilities "pre-cool" their buildings by running the HVAC system at night when theoretically electricity costs are lower and trying to use the thermal storage of the building to ride out the heat of the day, minimizing the usage of the HVAC system when electricity prices are higher. While this practice may be common, the benefits of pre-cooling overnight are not clear. See, e.g., P. Xu, et al., *Peak Demand reduction from Pre-Cooling with a Zone Temperature reset in an Office Building*, 2004 ACEEE Summer Study on Energy Efficiency in Buildings, Pacific Grove, Calif., Aug. 23-27, 2004, the contents of which are hereby incorporated by reference in its entirety. A more appropriate, and potentially more economically lucrative, way to control a facility's HVAC electric load level involves dispatching the load in response to price levels. As was shown previously, the electric power of the chiller can be adjusted simply by raising or lowering the outlet temperature setpoint. To implement such a strategy it is important to understand how the load will respond when the temperature setpoint is adjusted. A simple expression for the change in real power level ΔP based on the model developed herein is shown below in (10):

$$\Delta P = P_s(\Theta_o) - P_s(\Theta_s) \quad (10)$$

where Ps(Θo) is static load function of equation (3) evaluated before the temperature change and Ps(Θs) is static load function of equation (3) evaluated at the new steady state temperature value.

This simple application of the model can be used to accurately shed a specific amount of a facility's electric load. In addition to being able to commit to shedding a specific amount of power, a customer can use this model to know how long it will take to reach this new load level as well as how low the load level reaches during the transient period and how long this will last. The parameter values estimated in Sections A-C herein show that the time delays in the system are significant. This is particularly important if a facility has a family of HVAC chiller units that can be considered controllable for demand response purposes, as depicted in FIG. 5.

Figure 5:
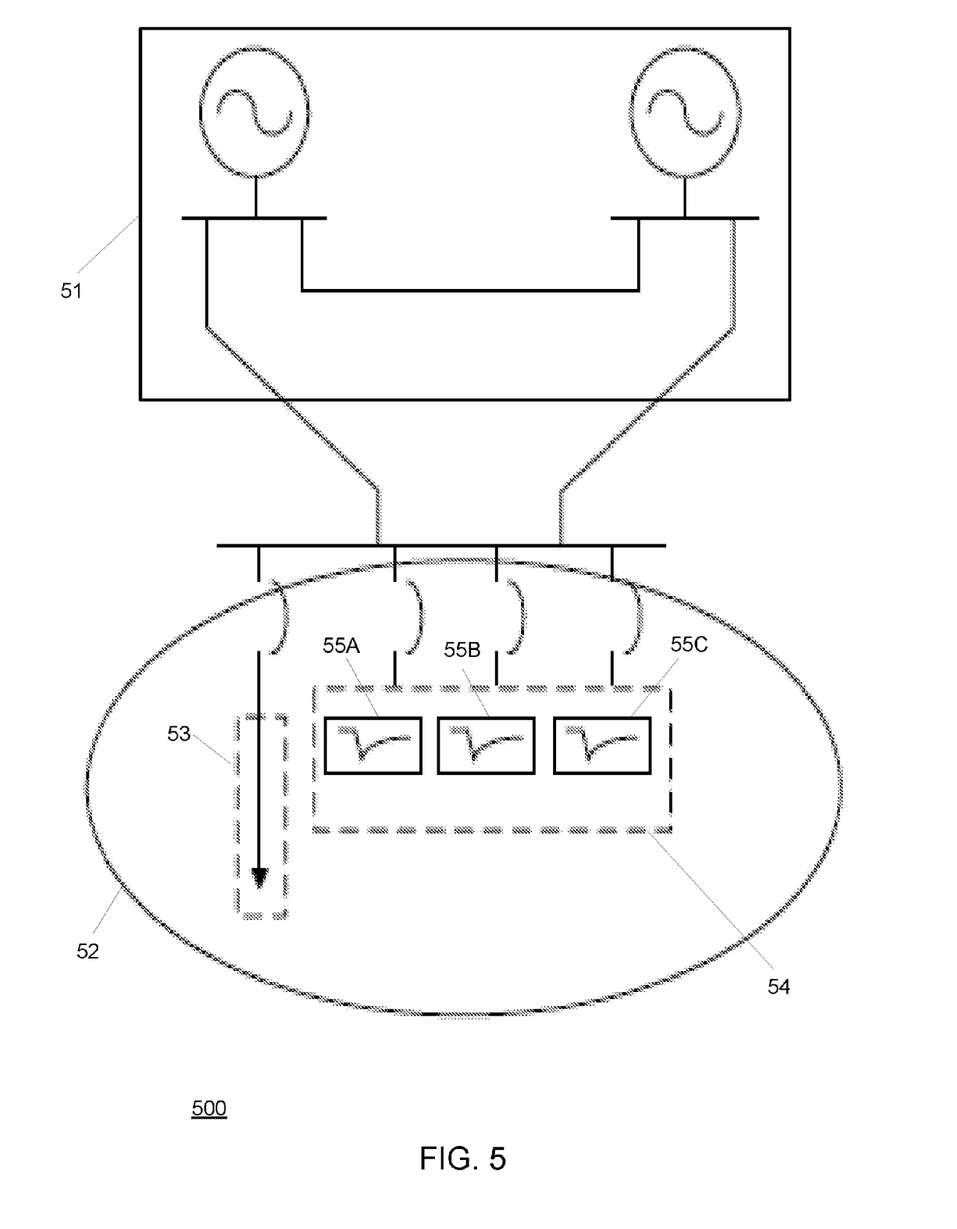
FIG. 5 illustrates one embodiment of controllable and uncontrollable loads for demand response.

FIG. 5 illustrates one embodiment of an electrical system 500. In electrical system 500 the electric utility 51 may supply electricity to a customer's electric load 52. The customer electric load 52 may contain uncontrollable load 53 and controllable load 54. Controllable load 54 may contain HVAC chillers 55A, 55B, and 55C.

The end goal in such a scenario such as FIG. 5 may be to determine the optimal dispatch schedule for alone or more of the HVAC chiller units over one or more days. Including the load dynamics is essential in determining such a schedule.

Figure 6:
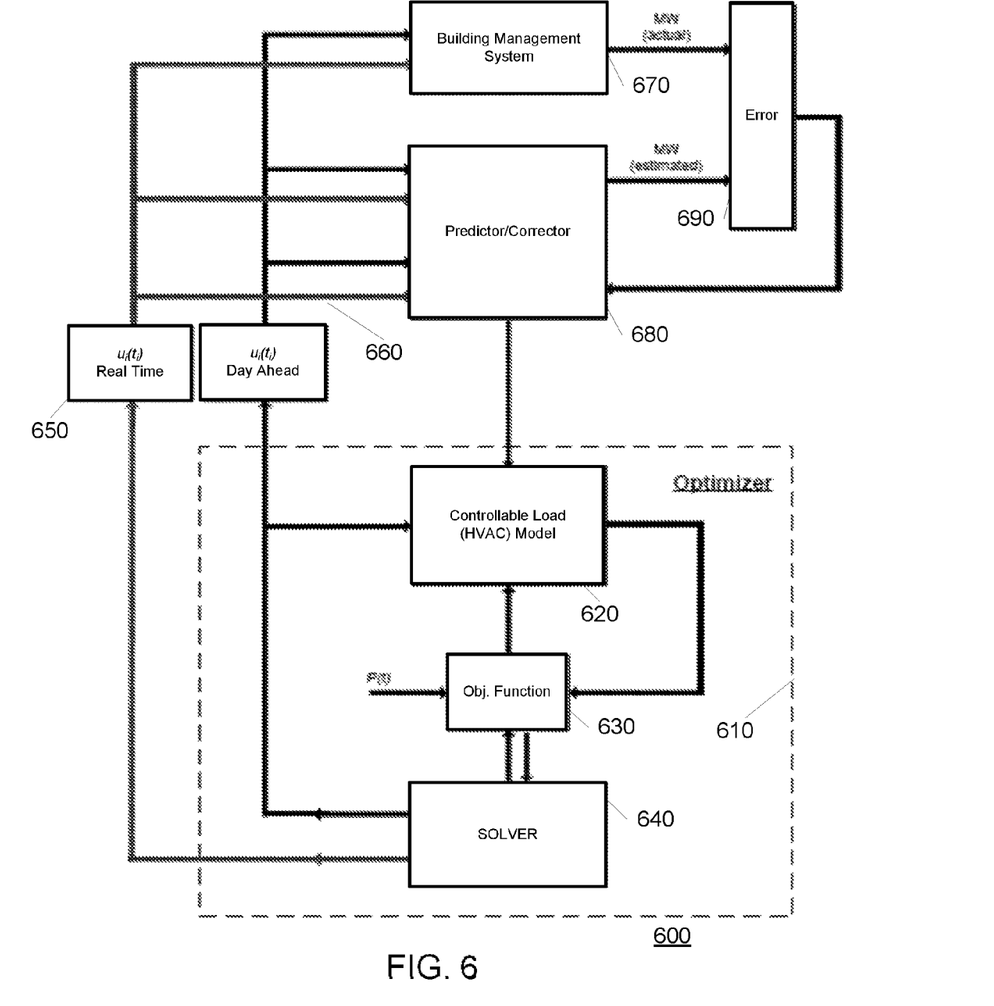
FIG. 6 is a flow chart illustrating one embodiment for utilizing a dynamic HVAC chiller load model in a scheme for determining an optimal dispatch for real-time and/or day-ahead demand response.

FIG. 6 presents a general approach 600 to utilizing the dynamic HVAC load model in a scheme for determining an optimal dispatch schedule for real-time and day-ahead demand response. Approach 600 may include an optimizer 610, a real-time scheduler 650, a day ahead scheduler 660, a predictor/corrector 680, a building management system 670, and an error module 690. While each of the components of approach 600 are described separately below, they may be combined into one or more combined devices according to an exemplary embodiment. Furthermore, each component or combined device may include hardware, firmware, software, or any combination of hardware, firmware and software.

Optimizer 610 may comprise a controllable load model 620 (also referred to as a dynamic load model), an objective function 630, and a solver 640. Controllable load model 620 may contain a model of one or more exemplary HVAC chillers as well as each model's parameters. Obtaining a model of an HVAC chiller as well as obtaining the model parameters is described in, for example, sections B. and C. of this application.

Objective function 630 may represent a desired outcome which results from changing the load of an HVAC chiller. For example, by changing the load of an HVAC chiller a customer may wish to minimize the amount of money spent on electricity, minimize the amount of $CO_2$ being produced in connection with a specific building, coordinate work schedules to coincide with low energy costs, etc.

Solver 640 receives the controllable load model 620 and the objective function 630 and creates or updates a real-time load schedule and/or a day-ahead schedule that are consistent with the controllable load model 620 and the objective function 630. Each schedule contains one or more commands that are indexed by time and relate to one or more parameters of a building's HVAC system. For example, an exemplary command related to a building's HVAC system may change the outlet water temperature setpoint of a HVAC chiller at a specific time. The real-time load schedule and the day-ahead schedule are stored in the real-time scheduler 650 and the day-ahead scheduler 660, respectively.

The real-time scheduler 650 and the day-ahead scheduler 660 contain a schedule of commands. In an exemplary embodiment, the day-ahead scheduler 660 contains an entire day's worth of commands. In comparison, the real-time schedule 650 contains only enough commands to control the system for a short period of time. In an exemplary embodiment, the commands in the real-time scheduler 650 may override the commands in the day-ahead scheduler.

The building management system 670 receives commands from the real-time scheduler 650 and the day-ahead scheduler 660 and executed the appropriate set of commands. The building management system 670 also regularly sends error module 690 information regarding the amount of power being consumed by the HVAC system. The building management system 670 may also send error module 690 information on individual components of the HVAC system, such as individual chillers.

The predictor/corrector 680 receives the commands from the real-time scheduler 650 and the day-ahead scheduler 660 and compares them to controllable load model 620. The predictor/corrector 680 then estimates how much power all or part of the HVAC system should draw based on the controllable load model 620. The predictor/corrector 680 then sends this estimate to the error module 690.

Error module 690 compares the amount of energy actually being consumed by all or part of the HVAC system, as received from the building and management system 670, to the estimated amount of power the all or part of the HVAC system should be using, as received by the predictor/corrector 680. This error information is fed back into the predictor/corrector 680 which then updates the load controllable load model 620.

Figure 7:
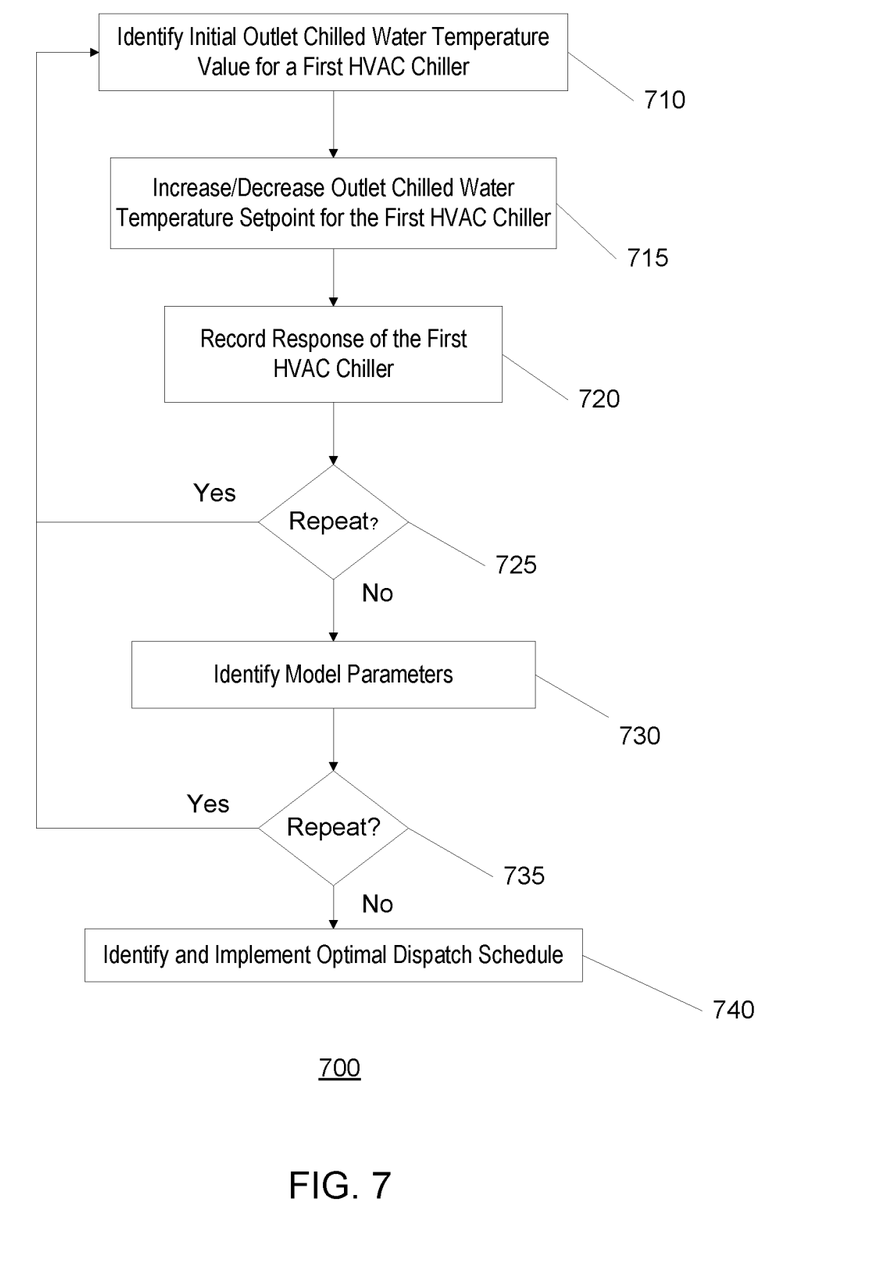
FIG. 7 illustrates an exemplary flowchart for utilizing a dynamic HVAC chiller load model in a building's demand response plan.

FIG. 7 illustrates an exemplary flowchart 700 for utilizing the dynamic HVAC chiller load model discussed above in a building's demand response plan. The HVAC chiller dynamic load model is represented by equations (2)-(5). Flowchart 700 is described with reference to FIGS. 1A through 5.

In block 710, the initial outlet chilled water temperature value $\Theta o$ is identified for a first HVAC chiller, such as HVAC chiller 55A. The initial outlet chilled water temperature value $\Theta o$ may be identified by determining the outlet water temperature setpoint for HVAC chiller 55A.

In block 715, the response of the HVAC chiller may be tested by increasing or decreasing the outlet chilled water temperature setpoint for HVAC chiller 55A.

In block 720, test data related to the response of HVAC chiller 55A may be recorded. As described in connection with FIGS. 1A-2, the recorded response of HVAC chiller 55A may include load data and outlet water temperature values for HVAC chiller 55A. Examples of load data include FLA, voltage, and response time.

In block 725, blocks 710, 715, and/or 720 may be repeated, as necessary, for HVAC chiller 55A in order to obtain a larger dataset.

In block 730, model parameters for HVAC chiller 55A are identified. As described above, these parameters can be identified by directly observing the data, utilizing equations (2)-(5), and by curve fitting the test data. In an exemplary embodiment, the recorded response of HVAC chiller 55A may be graphically expressed in order to facilitate the identification of model parameters. FIG. 1A through FIG. 4 are examples how the recorded response of an HVAC chiller may be placed in a graphical format.

In block 735, blocks 710 through 730 may be repeated for each additional HVAC chiller, such as HVAC chillers 55B and 55C of FIG. 5.

In block 740, the model for HVAC chillers 55A, 55B, and 55C, as well as the models' parameters, may be utilized to identify and implement an optimal dispatch schedule for one or more of HVAC chillers 55A, 55B, and 55C.

In an exemplary embodiment, flowchart 700 may be performed by a processor, elements of FIG. 6, and/or a separate computer system.

Figure 8:
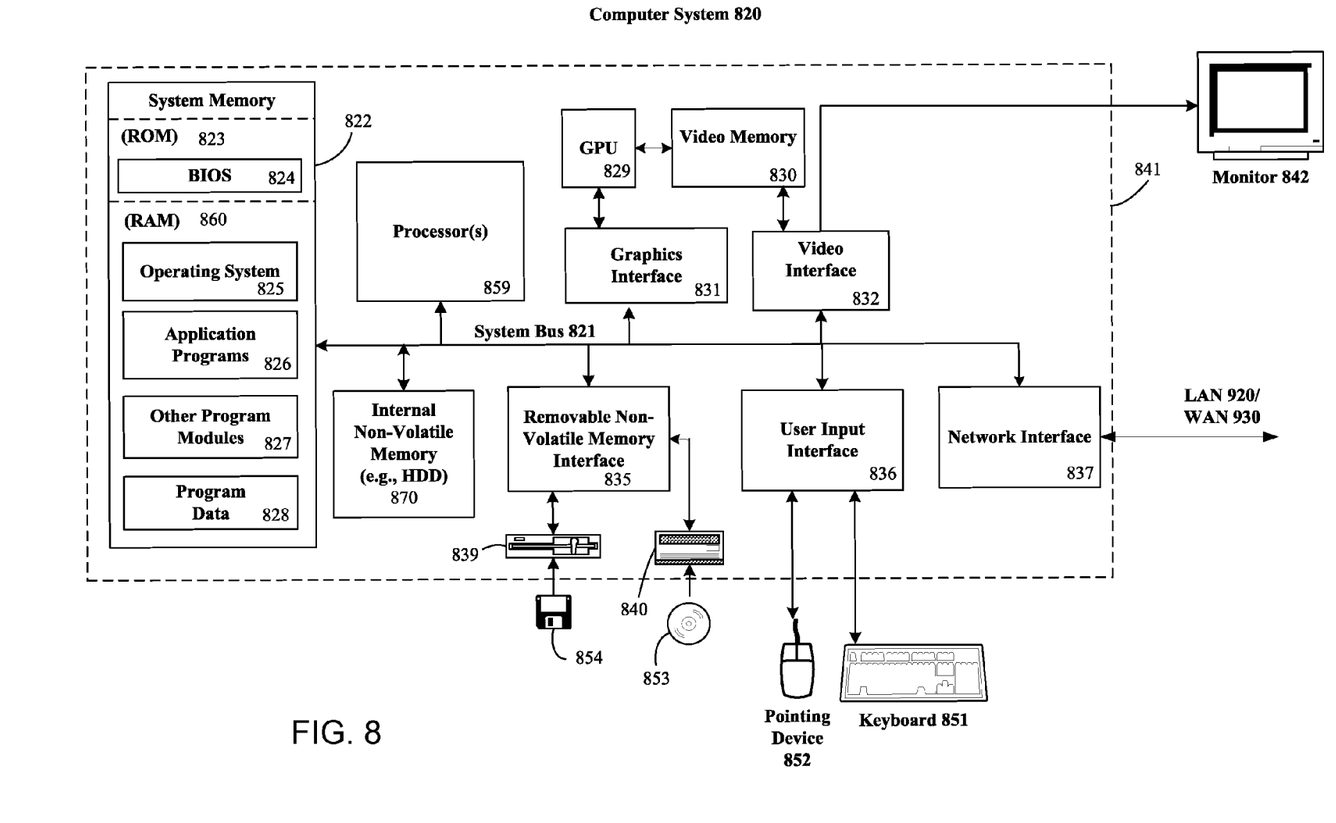
FIG. 8 is a block diagram of one embodiment of a computer system in which aspects of the disclosed systems and methods may be embodied.

FIG. 8 is a block diagram of an example computer system 820 on which the embodiments described herein and/or various components thereof may be implemented. For example, the functions performed by the entities described in the various embodiments above may be performed by one or more such example computer systems. For example, a processor, one or more elements of FIG. 6, and/or flowchart 700 may all be implemented, in whole or in part, in software (i.e., computer executable instructions or program code) executing on one or more such computer systems 820. It is understood, however, that the computer system 820 is just one example of a suitable computing environment and is not intended to suggest any limitation as to the scope of use or functionality of the presently disclosed subject matter. Neither should the computer system 820 be interpreted as having any dependency or requirement relating to any one or combination of components illustrated in FIG. 8. Since the state of the art has evolved to a point where there is little difference between hardware, software, or a combination of hardware/software, the selection of hardware versus software to effectuate specific functions is a design choice left to an implementer. More specifically, a software process may be transformed into an equivalent hardware structure, and a hardware structure may itself be transformed into an equivalent software process. Thus, the selection of a hardware implementation versus a software implementation is one of design choice and left to the implementer.

In FIG. 8, the computer system 820 comprises a computer 841, which may include a variety of computer readable media. Computer readable media may be available media that may be accessed by computer 841 and may include volatile and/or nonvolatile media, removable and/or non-removable media. The system memory 822 may include computer storage media in the form of volatile and/or nonvolatile memory such as read only memory (ROM) 823 and random access memory (RAM) 860. A basic input/ output system 824 (BIOS), containing the basic routines that help to transfer information between elements within computer 841, such as during start-up, may be stored in ROM 823. RAM 860 may contain data and/or program modules that are immediately accessible to and/or presently being operated on by processing unit 859. By way of example, and not limitation, FIG. 8 illustrates operating system 825, application programs 826, other program modules 827, and program data 828.

The computer 841 may also include other removable/non-removable, volatile/nonvolatile computer storage media. By way of example, the computer 841 may include a hard disk drive 870 that reads from or writes to non-removable, nonvolatile magnetic media, a magnetic disk drive 839 that reads from or writes to a removable, nonvolatile magnetic disk 854, and an optical disk drive 840 that reads from or writes to a removable, nonvolatile optical disk 853 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Magnetic disk drive 839 and optical disk drive 840 may be connected to the system bus 821 by a removable memory interface, such as interface 835. The drives and their associated computer storage media discussed herein, and illustrated in FIG. 8, may provide storage of computer readable instructions, data structures, program modules and other data for the computer 841.

A user may enter commands and information into the computer 841 through input devices such as a keyboard 851 and/or pointing device 852, commonly referred to as a mouse, trackball, or touch pad. Other input devices (not shown) may include a microphone, joystick, game pad, satellite dish, scanner, or the like. These and other input devices may be connected to the processing unit 859 through a user input interface 836 that is coupled to the system bus, but may be connected by other interface and/or bus structures, such as a parallel port, game port, or a universal serial bus (USB) for example. The computer may connect to a local area network or wide area network, such as LAN 920 and/or WAN 930, through a network interface or adapter 837.

As is apparent from the embodiments described herein, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., computer executable instructions). This program code may be stored on a computer-readable storage medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes may include a processor, a storage medium readable by the processor (including volatile and/or non-volatile memory and/or storage elements), at least one input device, and/or at least one output device. The program code may be implemented in a high level procedural or object oriented programming language. Alternatively, the program code may be implemented in an assembly or machine language. In any case, the language may be a compiled or interpreted language. When implemented on a general-purpose processor, the program code may combine with the processor to provide a unique apparatus that operates analogously to specific logic circuits. As used herein, the terms "computer-readable medium" and "computer-readable storage medium" do not include a signal.

As the foregoing illustrates, the present invention is directed to systems, methods, and apparatus. Changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

E. CONCLUSIONS

The embodiments disclosed herein are directed to implementing a distribution energy management system that integrates dynamic load optimization. According to one embodiment, a dynamic electric load model for an HVAC chiller has been presented. This model was developed from testing performed on an actual building HVAC system on Drexel University's campus. This model demonstrates the effects of temperature dependence on the electric power response, the resulting time delays, and the importance of incorporating these phenomena into any demand response planning. Additionally, future applications of this dynamic model to demand response have also been presented.

What is claimed:

1. A method for using a dynamic electrical load model to model an energy consumption characteristic in a building with respect to changes in temperature for use in demand response applications, the method comprising:

determining changes in a building temperature control;

using a dynamic electrical load model to accurately model electrical energy consumption of an HVAC chiller in response to the changes in the building temperature control, wherein the dynamic electrical load model is automatically updated to account for a difference between a modeled electrical energy consumption of the HVAC chiller and an actual electrical energy consumption of the HVAC chiller, and wherein the dynamic electrical load model operates in accordance with the equation $P_d(t)=P_s(\Theta)+(P_t(\Theta)-P_s(\Theta))e^{-(t-t_c)/T_r}$, wherein $P_d$ is a dynamic electrical load as a function of time t, $\Theta$ is an outlet water temperature, $P_s$ is a steady state electric power level as a function of $\Theta$, $P_t$ is a transient power level as a function of $\Theta$, $t_c$ is a time delay between an outlet water temperature setpoint change of the HVAC chiller and a corresponding response in $\Theta$, and $T_r$ is a load power recovery time;

planning a real-time schedule for dispatching of energy and a day-ahead schedule for dispatching of energy for demand side response based on said use of said dynamic electrical load model; and dispatching energy for demand side response in accordance with the real-time schedule and the day-ahead schedule.

2. A computer-implemented method for using a dynamic electrical load model to model an energy consumption characteristic in a building with respect to changes in temperature for use in demand response applications, the method comprising:

using a dynamic electrical load model to accurately model electrical energy consumption of an HVAC chiller, wherein the dynamic electrical load model is automatically updated to account for a difference between a modeled electrical energy consumption of the HVAC chiller and an actual electrical energy consumption of the HVAC chiller, and wherein the dynamic electrical load model operates in accordance with the equation $P_d(t)=P_s(\Theta)+(P_t(\Theta)-P_s(\Theta))e^{-(t-tc)/T_r}$, wherein $P_d$ is a dynamic electrical load as a function of time t, $\Theta$ is an outlet water temperature, $P_s$ is a steady state electric power level as a function of $\Theta$, $P_t$ is a transient power level as a function of $\Theta$, $t_c$ is a time delay between an outlet water temperature setpoint change of the HVAC chiller and a corresponding response in $\Theta$, and $T_r$ is a load power recovery time;

planning a real-time schedule for dispatching of energy and a day-ahead schedule for dispatching of energy load for demand side response based on said use of said dynamic electrical load model; and dispatching energy for demand side response in accordance with the real-time schedule and the day-ahead schedule.

3. The computer-implemented method of claim 2, wherein the dynamic electrical load model is a function of time, an outlet water temperature setpoint of the HVAC chiller, and electrical load of the HVAC chiller.

4. The computer-implemented method of claim 2, wherein the dynamic electrical load model is a component-based model.

5. The computer-implemented method of claim 2, wherein the modeled electrical energy consumption of an HVAC chiller is a function of time and an outlet water temperature setpoint of the HVAC chiller.

6. The computer-implemented method of claim 2, further comprising:
creating the dynamic electrical load model, wherein creating the dynamic electrical load model comprises:
gathering test data related to a response of the HVAC chiller to an increase of an outlet water temperature setpoint; and
estimating a parameter of the dynamic electrical load model using the test data.

7. The computer-implemented method of claim 6, wherein estimating the parameter comprises:
curve fitting a graphical expression of the test data.

8. The computer-implemented method of claim 6, further comprising:
dispatching part of an electrical energy consumed by the HVAC chiller by lowering the outlet water temperature setpoint of the HVAC chiller;
recording the actual electrical energy consumption of the HVAC chiller in response to the lowered outlet water temperature setpoint;
identifying a predicted electrical energy consumption of the HVAC chiller based on the dynamic electrical load model and the lowered outlet water temperature setpoint of the HVAC chiller;
comparing the predicted electrical energy consumption against the actual electrical energy consumed by the HVAC chiller; and
updating the dynamic electrical load model based on the comparison.

9. The computer-implemented method of claim 2, further comprising:
dispatching part of an electrical energy consumed by the HVAC chiller by lowering an outlet temperature setpoint of the HVAC chiller.

10. The computer-implemented method of claim 9, wherein part of the electrical energy consumption of the HVAC chiller is dispatched in response to energy costs.

11. The computer-implemented method of claim 2, further comprising:
determining changes in a building temperature control, wherein using the dynamic electrical load model to accurately model electrical energy consumption of the HVAC chiller is in response to the changes in the building temperature control.

12. A computer-readable storage medium, the computer-readable medium having computer executable instructions thereon that are configured to cause a computer system to perform the following steps when executed:
using a dynamic electrical load model to accurately model electrical energy consumption of an HVAC chiller, wherein the dynamic electrical load model is automatically updated to account for a difference between a modeled electrical energy consumption of the HVAC chiller and an actual electrical energy consumption of the HVAC chiller, and wherein the dynamic electrical load model operates in accordance with the equation $P_d(t)=P_s(\Theta)+(P_t(\Theta)-P_s(\Theta))e^{-(t-tc)/T_r}$, wherein $P_d$ is a dynamic electrical load as a function of time t, $\Theta$ is an outlet water temperature, $P_s$ is a steady state electric power level as a function of $\Theta$, $P_t$ is a transient power level as a function of $\Theta$, $t_c$ is a time delay between an outlet water temperature setpoint change of the HVAC chiller and a corresponding response in $\Theta$, and $T_r$ is a load power recovery time;

planning a real-time schedule for dispatching of energy and a day-ahead schedule for dispatching of energy load for demand side response based on said use of said dynamic electrical load model; and dispatching energy for demand side response in accordance with the real-time schedule and the day-ahead schedule.

13. The computer-readable storage medium of claim 12, wherein the dynamic electrical load model is a function of time, an outlet water temperature setpoint of the HVAC chiller, and electrical load of the HVAC chiller.

14. The computer-readable storage medium of claim 12, wherein the dynamic electrical load model is a component-based model.

15. The computer-readable storage medium of claim 12, wherein the electrical energy consumption of an HVAC chiller is a function of time and an outlet water temperature setpoint of the HVAC chiller.

16. The computer-readable storage medium of claim 12, wherein the computer-executable instructions are further configured to cause a computer system to perform the following steps when executed:
creating the dynamic electrical load model, wherein creating the dynamic electrical load model comprises:
gathering test data related to a response of the HVAC chiller to an increase of an outlet water temperature setpoint; and
estimating a parameter of the dynamic electrical load model using the test data.

17. The computer-readable storage medium of claim 16, wherein estimating the parameter comprises:
curve fitting a graphical expression of the test data.

18. The computer-readable storage medium of claim 16, wherein the computer-executable instructions are further configured to cause a computer system to perform the following steps when executed:

dispatching part of an electrical energy consumed by the HVAC chiller by lowering the outlet water temperature setpoint of the HVAC chiller;

recording the actual electrical energy consumption of the HVAC chiller in response to the lowered water outlet temperature setpoint;

identifying a predicted electrical energy consumption of the HVAC chiller based on the dynamic electrical load model and the lowered water outlet temperature setpoint of the HVAC chiller;

comparing the predicted electrical energy consumption against the actual electrical energy consumed by the HVAC chiller; and updating the dynamic electrical load model based on the comparison.

19. The computer-readable storage medium of claim 12, wherein the computer-executable instructions are further configured to cause a computer system to perform the following steps when executed:

dispatching part of an electrical energy consumed by the HVAC chiller by lowering an outlet temperature setpoint of the HVAC chiller.

20. The computer-readable storage medium of claim 12, wherein the computer-executable instructions are further configured to cause a computer system to perform the following steps when executed:

determining changes in a building temperature control, wherein using the dynamic electrical load model to accurately model electrical energy consumption of the HVAC chiller is in response to the changes in the building temperature control.

* * * * *